(12) United States Patent
Xiong et al.

(10) Patent No.: US 9,294,758 B2
(45) Date of Patent: Mar. 22, 2016

(54) DETERMINING DEPTH DATA FOR A CAPTURED IMAGE

(71) Applicant: Microsoft Corporation, Redmond, WA (US)

(72) Inventors: Zhiwei Xiong, Beijing (CN); Feng Wu, Beijing (CN); Zhe Yang, Liaoning (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 412 days.

(21) Appl. No.: 13/865,989

(22) Filed: Apr. 18, 2013

(65) Prior Publication Data

US 2014/0313292 A1  Oct. 23, 2014

(51) Int. Cl.
*H04N 13/02* (2006.01)
*G06T 7/00* (2006.01)
*G01B 11/25* (2006.01)

(52) U.S. Cl.
CPC ........ *H04N 13/0271* (2013.01); *G01B 11/2513* (2013.01); *G06T 7/0057* (2013.01); *G06T 7/0065* (2013.01); *G06T 2207/10016* (2013.01); *G06T 2207/10152* (2013.01)

(58) Field of Classification Search
CPC  H04N 13/0271; G06T 7/0057; G06T 7/0065; G01B 11/2513
See application file for complete search history.

(56) References Cited

U.S. PATENT DOCUMENTS

| | | | |
|---|---|---|---|
| 2007/0263903 A1* | 11/2007 | St. Hilaire et al. | 382/106 |
| 2010/0118123 A1* | 5/2010 | Freedman et al. | 348/46 |
| 2010/0177164 A1* | 7/2010 | Zalevsky et al. | 348/46 |
| 2011/0157599 A1 | 6/2011 | Weaver et al. | |
| 2011/0187820 A1* | 8/2011 | Gilboa et al. | 348/43 |
| 2011/0279648 A1* | 11/2011 | Lutian et al. | 348/46 |
| 2012/0194650 A1* | 8/2012 | Izadi et al. | 348/47 |
| 2012/0262550 A1* | 10/2012 | Bridges | 348/46 |
| 2013/0002860 A1 | 1/2013 | Yamaguchi et al. | |
| 2013/0004082 A1 | 1/2013 | Kano et al. | |
| 2013/0011048 A1 | 1/2013 | Yamashita et al. | |

OTHER PUBLICATIONS

"International Search Report & Written Opinion for PCT Patent Application No. PCT/US2014/034436", Mailed Date: Jul. 25, 2014, Filed Date: Apr. 17, 2014, 13 pages.

Wang, et al., "Three-Dimensional Shape Measurement With Binary Dithered Patterns", In Applied Optics, Optical Society of America, vol. 51, Issue 27, Sep. 20, 2012, pp. 6631-6636.

Zhang, Song, "Flexible 3D Shape Measurement Using Projector Defocusing: Extended Measurement Range", In Optics Letters, Optical Society of America, vol. 35, Issue 7, Apr. 1, 2010, pp. 934-936.

(Continued)

*Primary Examiner* — Jefferey Harold
*Assistant Examiner* — Sean Haiem
(74) *Attorney, Agent, or Firm* — Sandy Swain; Micky Minhas (57) ABSTRACT

A method, system, and one or more computer-readable storage media for depth acquisition from density modulated binary patterns are provided herein. The method includes capturing a number of images for a scene using an IR camera and a number of IR lasers including diffraction grates. Each image includes a density modulated binary pattern carrying phase information. The method also includes performing pixel based phase matching for the images to determine depth data for the scene based on the phase information carried by the density modulated binary patterns.

18 Claims, 10 Drawing Sheets

(56) References Cited

OTHER PUBLICATIONS

Zhang, et al., "Hybrid Structured Light for Scalable Depth Sensing" In 19th IEEE International Conference on Image Processing, Sep. 30, 2012, pp. 17-20.

Casey, Charles Joseph, "Enhancements to the Modified Composite Pattern Method of Structured Light 3d Capture", Retrieved at <<http://uknowledge.uky.edu/cgi/viewcontent.cgi?article=1225 &context=gradschool_diss>>, PHD Dissertation, May 6, 2011, pp. 165.

Ospald, Felix, Performance Analysis for a Structured Light Range-Sensor, Retrieved at <<http://sites.google.com/site/matthiasvoigt/DiplThesisFelixOspald.pdf>>, Diploma Thesis, Sep. 2007, pp. 141.

Kirmani, et al., "Codac: A Compressive Depth Acquisition Camera Framework", Retrieved at <<http://www.rle.mit.edu/stir/documents/KirmaniCWG_ICASSP2012.pdf>>, IEEE International Conference on Acoustics, Speech and Signal Processing, Mar. 25, 2012, pp. 4.

Yalla, Veeraganesh, "Optimal Phase Measuring Profilometry Techniques for Static and Dynamic 3D Data Acquisition", Retrieved at <<http://uknowledge.uky.edu/cgi/viewcontent.cgi?article=1351 &context=gradschool_diss>>, Jan. 12, 2006, pp. 222.

Albitar, et al., "Robust Structured Light Coding for 3D Reconstruction", Retrieved at <<http://ieeexplore.ieee.org/stamp/stamp.jsp?tp= &arnumber=4408982, In Proceeding of IEEE 11th International Conference on Computer Vision, Oct. 14, 2007, pp. 6.

Blais, Francois., "Review of 20 Years of Range Sensor Development", Retrieved at <<http://foto.hut.fi/opetus/295/pg_course2008/beraldin/NRC-46531.pdf>>, In Journal of Electronic Imaging, vol. 13, Issue 1, Jan. 2004, pp. 14.

Charles, et al., "Learning Shape Models for Monocular Human Pose Estimation from the Microsoft Xbox Kinect", Retrieved at <<http://ieeexplore.ieee.org/stamp/stamp.jsp?tp=&arnumber=6130387>>, In Proceeding of IEEE International Conference on Computer Vision Workshops, Nov. 6, 2011, pp. 7.

Chen, et al., "Vision Processing for Realtime 3-D Data Acquisition Based on Coded Structured Light", Retrieved at <<http://ieeexplore.ieee.org/stamp/stamp.jsp?arnumber=04429304>>, In IEEE Transactions on Image Processing, vol. 17, No. 2, Feb. 2008, pp. 10.

Chen, et al., "Polarization and Phase-Shifting for 3D Scanning of Translucent Objects", Retrieved at <<http://ieeexplore.ieee.org/stamp/stamp.jsp?tp=&arnumber=4270234>>, In Proceeding of IEEE Computer Society Conference on Computer Vision and Pattern Recognition, Jun. 17, 2007, pp. 8.

Chen, et al., "Modulated Phase-Shifting for 3D Scanning", Retrieved at <<http://ieeexplore.ieee.org/stamp/stamp.jsp?tp= &arnumber=4587836>>, In Proceeding of IEEE Computer Society Conference on Computer Vision and Pattern Recognition, Jun. 23, 2008, pp. 8.

"Meshlab", Retrieved at <<http://meshlab.sourceforge.net/>>, Retrieved Date: Feb. 15, 2013, pp. 8.

Fong, et al., "Sensing Deforming and Moving Objects with Commercial Off the Shelf Hardware", Retrieved at <<http://ieeexplore.ieee.org/stamp/stamp.jsp?tp=&arnumber=1565411>>, In Proceedings of the IEEE Computer Society Conference on Computer Vision and Pattern Recognition, Jun. 25, 2005, pp. 8.

Gu, et al., "Multiplexed Illumination for Scene Recovery in the Presence of Global Illumination", Retrieved at <<http://ieeexplore.ieee.org/stamp/stamp.jsp?tp=&arnumber=6126305>>, In Proceeding of IEEE International Conference on Computer Vision, Nov. 6, 2011, pp. 8.

Gupta, et al., "Micro Phase Shifting", Retrieved at <<http://www1.cs.columbia.edu/CAVE/publications/pdfs/Gupta_CVPR12.pdf>>, In Proceedings of the IEEE Conference on Computer Vision and Pattern Recognition, Jun. 16, 2012, pp. 8.

Izadi, et al., "KinectFusion: Real-Time 3D Reconstruction and Interaction using a Moving Depth Camera", Retrieved at <<http://www.superbendy.com/wp-content/uploads/2012/01/kinectfusion.pdf>>, In Proceedings of the 24th Annual ACM Symposium on User Interface Software and Technology, Oct. 16, 2011, pp. 10.

Kawasaki, et al., "Dynamic Scene Shape Reconstruction using a Single Structured Light Pattern", Retrieved at <<http://ieeexplore.ieee.org/stamp/stamp.jsp?tp=&arnumber=4587702>>, In Proceeding of IEEE Computer Society Conference on Computer Vision and Pattern Recognition, Jun. 23, 2008, pp. 8.

Khoshelham, et al., "Accuracy and Resolution of Kinect Depth Data for Indoor Mapping Applications", Retrieved at <<http://www.ncbi.nlm.nih.gov/pmc/articles/PMC33041201>>, In Journal of Sensors, vol. 12, Issue 2, Feb. 1, 2012, pp. 8.

Koninckx, et al., "Real-Time Range Acquisition by Adaptive Structure Light", Retrieved at <<http://ieeexplore.ieee.org/stamp/stamp.jsp?tp=&arnumber=1580487>>, In IEEE Transactions on Pattern Analysis and Machine Intelligence, vol. 28, No. 3, Mar. 2006, pp. 14.

Koninckx, et al., "Scene-Adapted Structured Light", Retrieved at <<http://ieeexplore.ieee.org/stamp/stamp.jsp?tp= &arnumber=1467498>>, In Proceeding of IEEE Computer Society Conference on Computer Vision and Pattern Recognition, Jun. 20, 2005, pp. 8.

Maurice, et al., "A Pattern Framework Driven by the Hamming Distance for Structured Light-Based Reconstruction with a Single Image", Retrieved at <<http://ieeexplore.ieee.org/stamp/stamp.jsp?tp=&arnumber=5995490>>, In Proceeding of IEEE Computer Vision and Pattern Recognition, Jun. 20, 2011, pp. 8.

Nayar, et al., "Fast Separation of Direct and Global Components of a Scene using High Frequency Illumination", Retrieved at <<http://www1.cs.columbia.edu/CAVE/publications/pdfs/Krishnan_TOG06.pdf>>, In Proceeding of ACM SIGGRAPH, Jul. 30, 2006, pp. 10.

Vuylsteke, et al., "Range Image Acquisition with a Single Binary-Encoded Light Pattern", Retrieved at <<http://ieeexplore.ieee.org/stamp/stamp.jsp?tp=&arnumber=44402>>, In IEEE Transactions on Pattern Analysis and Machine Intelligence, vol. 12, No. 2, Feb. 1990, pp. 17.

Salvi, et al., "Pattern Codifications Strategies in Structured Light Systems", Retrieved at <<http://citeseerx.ist.psu.edu/viewdoc/download?doi=10.1.1.9.5774&rep=rep1&type=pdf>>, In Journal of Pattern Recognition, vol. 37, Issue 4, Apr. 2004, pp. 26.

Susanto, et al., "3D Object Detection with Multiple Kinects", Retrieved at <<http://www.d2.mpi-inf.mpg.de/sites/default/files/wandi12eccv.pdf>>, In 2nd Workshop on Consumer Depth Cameras for Computer Vision in conjunction with ECCV, Oct. 2012, pp. 10.

Wang, et al., "Period Coded Phase Shifting Strategy for Real-Time 3-D Structured Light Illumination •", Retrieved at <<http://ieeexplore.ieee.org/stamp/stamp.jsp?tp=&arnumber=5770217>>, In Journal of IEEE Transaction on Image Processing, vol. 20, Issue 11, Nov. 2011, pp. 13.

Weise, et al., "Fast 3D Scanning with Automatic Motion Compensation", Retrieved at <<http://ieeexplore.ieee.org/stamp/stamp.jsp?tp= &arnumber=4270316>>, In IEEE Computer Society Conference on Computer Vision and Pattern Recognition, Jun. 17, 2007, pp. 8.

Wissmann, et al., "Fast and Accurate 3D Scanning Using Coded Phase Shifting and High Speed Pattern Projection", Retrieved at <<http://ieeexplore.ieee.org/stamp/stamp.jsp?tp= &arnumber=5955350>>, In Proceeding of International Conference on 3D Imaging, Modeling, Processing, Visualization and Transmission, May 16, 2011, pp. 8.

Xia, et al., "Human Detection Using Depth Information by Kinect", Retrieved at <<http://cvrc.ece.utexas.edu/Publications/HAU3D11_Xia.pdf>>, In Proceeding of IEEE Computer Vision and Pattern Recognition, Jun. 21, 2011, pp. 8.

Zhang, et al., "GPU-Assisted High-Resolution, Real-Time 3-D Shape Measurement", Retrieved at <<http://www.opticsinfobase.org/view_article.cfm?gotourl= http%3A%2F%2Fwww%2Eopticsinfobase%2Eorg%2FDirect-PDFAccess%2F9C37715B-C04A-7E23-95BF4D09D4D9D817_ 114589%2Foe-14-20-9120%2Epdf%3Fda%3D1%26id%3D-114589%26seq%3D0%26mobile%3Dno&org=>>, In Journal of Optics Express, vol. 14, No. 20, Oct. 2006, pp. 10.

* cited by examiner

DETERMINING DEPTH DATA FOR A CAPTURED IMAGE

BACKGROUND

Systems for generating three-dimensional images of scenes rely on depth reconstruction techniques to determine the three-dimensional shapes of objects within the scenes. Some current systems utilize one-shot structured light based depth cameras to determine depth data for captured images. Such one-shot structured light systems use the depth cameras to emit patterns including random light spots, and then capture images including the emitted patterns. Depth data can then be determined by establishing the correspondences between a reference image and captured images including the patterns. However, depth data that is determined in this manner often suffers from holes and severe noise. In particular, the positions of the light spots are identified by blocks of pixels. Such blocks of pixels may be deformed when projected onto the boundary of objects within scenes. This may make it difficult to identify the correspondences between the images. Furthermore, the identified correspondences between the images may have limited accuracy in the case of abrupt depth change. As a result, the determined depth data may include random errors.

Phase shifting systems, which rely on the projection of a series of phase shifted sinusoidal patterns onto a scene, often provide higher quality depth data than the one-shot structured light systems described above. Such phase shifting systems can reconstruct depth data at every camera pixel with one set of captured images. Thus, the depth data may have higher spatial resolution. In addition, the depth data may be calculated from sinusoidal phase differences. As a result, noise may be suppressed, and the depth data may be more accurate. However, such systems rely on the use of projectors for the reconstruction of the depth data, as the sinusoidal patterns are grayscale.

SUMMARY

The following presents a simplified summary of the present embodiments in order to provide a basic understanding of some aspects described herein. This summary is not an extensive overview of the claimed subject matter. It is intended to neither identify critical elements of the claimed subject matter nor delineate the scope of the present embodiments. Its sole purpose is to present some concepts of the claimed subject matter in a simplified form as a prelude to the more detailed description that is presented later.

An embodiment provides a method for depth acquisition from density modulated binary patterns. The method includes capturing a number of images for a scene using an IR camera and a number of IR lasers including diffraction grates. Each image includes a density modulated binary pattern carrying phase information. The method also includes performing pixel based phase matching for the images to determine depth data for the scene based on the phase information carried by the density modulated binary patterns.

Another embodiment provides a system for depth acquisition from density modulated binary patterns. The system includes a number of IR lasers. Each IR laser is configured to emit a density modulate binary pattern carrying phase information onto a scene via a diffraction grate. The system also includes an IR camera configured to capture an image corresponding to the density modulated binary pattern emitted by each IR laser. The system further includes a processor and a system memory including code that, when executed by the processor, is configured to analyze the images to determine depth data for the scene based on the phase information carried by the density modulated binary patterns.

In addition, another embodiment provides one or more computer-readable storage media for storing computer-readable instructions. The computer-readable instructions provide a system for depth acquisition from density modulated binary patterns when executed by one or more processing devices. The computer-readable instructions include code configured to acquire images for a scene. The images are recursively captured using an IR camera and a number of IR lasers including diffraction grates. Each image includes a density modulated binary pattern carrying phase information. The computer-readable instructions also include code configured to correct phase ambiguity within the images based on a local uniqueness of each density modulated binary pattern. The computer-readable instructions further include code configured to perform pixel based phase matching for the images to reconstruct depth data for the scene based on the phase information carried by the density modulated binary patterns.

The following description and the annexed drawings set forth in detail certain illustrative aspects of the claimed subject matter. These aspects are indicative, however, of but a few of the various ways in which the principles of the present embodiments may be employed, and the claimed subject matter is intended to include all such aspects and their equivalents. Other advantages and novel features of the claimed subject matter will become apparent from the following detailed description of the present embodiments when considered in conjunction with the drawings.

DETAILED DESCRIPTION

As discussed above, structured light systems, such as one-shot structured light systems and phase shifting systems, are often utilized for the reconstruction of depth data for captured images. Triangulation based one-shot structured light systems are similar to passive stereo systems, except one-shot structured light systems rely on the use of projectors for the reconstruction of depth data for captured images. Furthermore, many structured light systems rely on the generation of multiple patterns, and are unable to detect motion for a scene when the patterns are projected.

Phase shifting systems emit a series of phase shifted sinusoidal patterns. Increasing the number of stripes in the patterns can improve measurement accuracy. However, when sets of patterns are emitted by phase shifting systems, the scene is assumed to be static. This assumption is not valid in many practical scenarios. Furthermore, phase shifting systems also rely on the use of projectors for the reconstruction of depth data, as the sinusoidal patterns are grayscale.

Therefore, embodiments described herein provide for the determination of depth data for captured images using an infrared (IR) camera and a number of IR lasers including diffraction grates. Specifically, the IR lasers are used to emit density modulated binary patterns onto a scene, and depth data for the scene are reconstructed based on the density of the light spots in the density modulated binary patterns, which corresponds to particular phase information.

According to embodiments described herein, the density modulated binary patterns are designed to carry sufficient phase information without compromising the ability to reconstruct the depth data from a single captured image. However, because the carried phase information is not strictly sinusoidal, the depth data reconstructed from the phase information may contain a systematic error. Therefore, according to embodiments described herein, a pixel based phase matching technique is used to reduce the error in the depth data.

Figure 1:
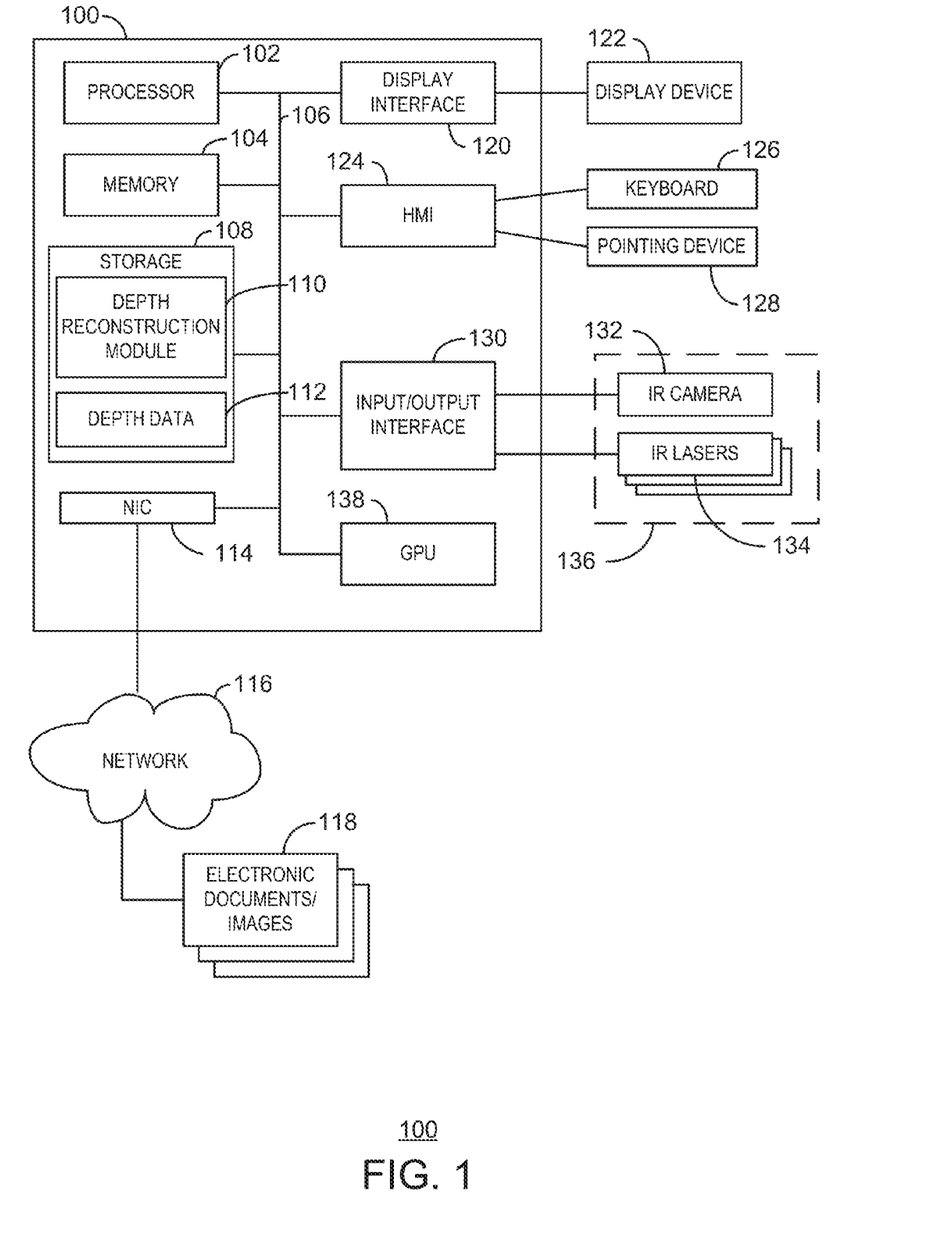
FIG. 1 is a block diagram of a computing system that may be used to determine depth data for captured images using density modulated binary patterns according to embodiments described herein.

As a preliminary matter, some of the figures describe concepts in the context of one or more structural components, variously referred to as functionality, modules, features, elements, or the like. The various components shown in the figures can be implemented in any manner, such as via software, hardware (e.g., discrete logic components), firmware, or any combinations thereof. In some embodiments, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrases "configured to" and "adapted to" encompass any way that any kind of functionality can be constructed to perform an identified operation. The functionality can be configured (or adapted) to perform an operation using, for instance, software, hardware, firmware, or the like.

The term "logic" encompasses any functionality for performing a task. For instance, each operation illustrated in the flowcharts corresponds to logic for performing that operation. An operation can be performed using, for instance, software, hardware, firmware, or the like.

As used herein, the terms "component," "system," and the like are intended to refer to a computer-related entity, either hardware, software (e.g., in execution), or firmware, or any combination thereof. For example, a component can be a process running on a processor, an object, an executable, a program, a function, a library, a subroutine, a computer, or a combination of software and hardware.

By way of illustration, both an application running on a server and the server can be a component. One or more components can reside within a process, and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device or media.

Computer-readable storage media can include but are not limited to magnetic storage devices (e.g., hard disk, floppy disk, and magnetic strips, among others), optical disks (e.g., compact disk (CD) and digital versatile disk (DVD), among others), smart cards, and flash memory devices (e.g., card, stick, and key drive, among others). In contrast, computer-readable media (i.e., not storage media) generally may additionally include communication media such as transmission media for wireless signals and the like.

FIG. 1 is a block diagram of a computing system 100 that may be used to determine depth data for captured images using density modulated binary patterns according to embodiments described herein. The computing system 100 may include a processor 102, e.g., a central processing unit (CPU), that is adapted to execute stored instructions, as well as a memory device 104 that stores instructions that are executable by the processor 102. Such instructions may be used to implement a method for reconstructing depth data for captured images. The processor 102 can be a single core processor, multi-core processor, computing cluster, or any number of other configurations. The memory device 104 can include random access memory (RAM), read only memory (ROM), flash memory, or any other suitable memory systems.

The processor 102 may be connected through a bus 106 to a storage device 108 adapted to store a depth reconstruction module 110 and depth data 112 generated by the computing system 100. The storage device 108 can include a hard drive, an optical drive, a thumbdrive, an array of drives, or any combinations thereof. A network interface controller 114 may be adapted to connect the processor 102 through the bus 106 to a network 116. Through the network 116, electronic text and imaging input documents 118 may be downloaded and stored within the computer's storage system 108. In addition, the computing system 100 may transfer depth data 112 over the network 116.

The processor 102 may be linked through the bus 106 to a display interface 120 adapted to connect the system 100 to a display device 122. The display device 122 can include a computer monitor, camera, television, projector, virtual reality display, three-dimensional (3D) display, or mobile device, among others. A human machine interface 124 within the computing system 100 may connect the processor 102 to a keyboard 126 and a pointing device 128. The pointing device 128 can include a mouse, trackball, touchpad, joy stick, pointing stick, stylus, or touchscreen, among others.

The processor 102 may also be linked through the bus 106 to an input/output interface 130 adapted to connect the computing system 100 to any number of additional input/output devices. In particular, according to embodiments described herein, the input/output interface 130 may connect the computing system 100 to an IR camera 132 and a number of IR lasers 134. For example, the input/output interface 130 may connect the computing system 100 to three IR lasers 134. Each IR laser 134 may also include an associated diffraction grate that provides for the generation of a unique binary pattern.

In some embodiments, the IR camera 132 and IR lasers 134 may be included within a single imaging device 136. The imaging device 136 may be a 3D camera, gaming system, computer, or the like. In other embodiments, all or a portion of the IR lasers 134 may be externally connected to an imaging device including the IR camera 132. Further, in some embodiments, the computing system 100 itself may be an imaging device. In such embodiments, the IR camera 132 and the IR lasers 134 may reside within the computing system 100, rather than being externally connected to the computing system 100 via the input/output interface 130.

Further, the computing system 100 may include a graphics processing unit (GPU) 138. The GPU 138 may be linked through the bus 106 to the processor 102, the memory device 104, the storage device 108, the input/output interface 130, and any number of other components of the computing system 100. In various embodiments, the GPU 138 is adapted to execute instructions, such as the instructions stored in the memory device 104, either in conjunction with or independently of the processor 102. For example, the GPU 138 may execute all or a portion of the instructions that are used to implement the method for reconstructing depth data for captured images. For example, in some embodiments, the processor 102 and the GPU 138 may be used in parallel for the reconstruction of depth data for captured images. In such embodiments, the depth data may be reconstructed at a rate of around 20 frames per second (fps).

The block diagram of FIG. 1 is not intended to indicate that the computing system 100 is to include all the components shown in FIG. 1. Further, the computing system 100 may include any number of additional components not shown in FIG. 1, depending on the details of the specific implementation.

Figure 2:
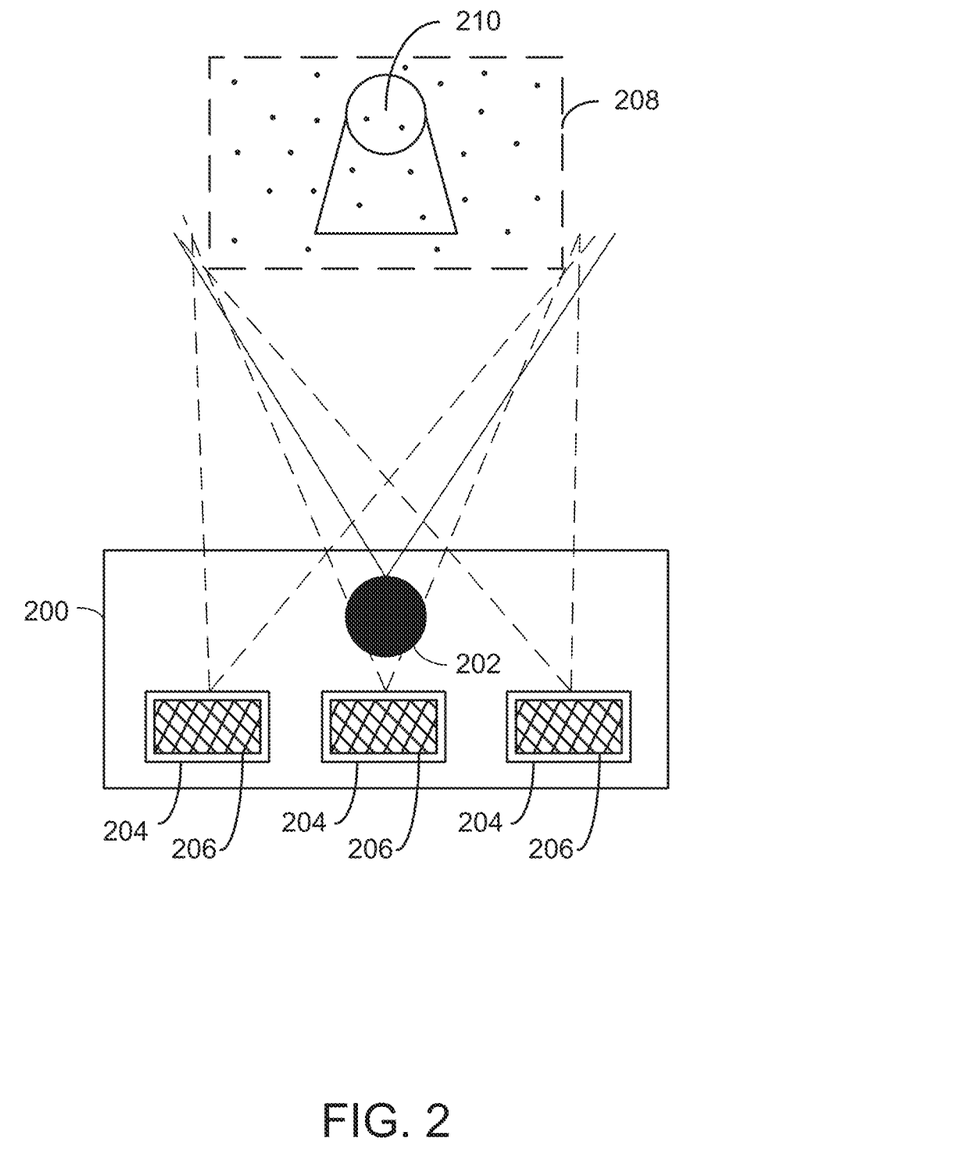
FIG. 2 is a schematic of an imaging device that may be used to capture images according to embodiments described herein.

FIG. 2 is a schematic of an imaging device 200 that may be used to capture images according to embodiments described herein. In some embodiments, the imaging device 200 is a device that is externally connected to a computing system, such as the imaging device 136 described with respect to the computing system 100 of FIG. 1. In other embodiments, the imaging device 200 is included directly within a computing system, such as the computing system 100 of FIG. 1.

The imaging device 200 may include an IR camera 202 and a number of IR lasers 204. For example, in various embodiments, the imaging device 200 includes three IR lasers 204. Each IR laser 204 may include a diffraction grate 206. The diffraction grates 206 may allow each IR laser 204 to emit a unique density modulated binary pattern. Further, the imaging device 200 may include a synchronized circuit for controlling the functioning of the IR camera 202 and the IR lasers 204.

In the embodiment shown in FIG. 2, the IR camera 202 is vertically aligned with the central IR laser 204. However, it is to be understood that the imaging device 200 is not limited to the configuration shown in FIG. 2. For example, in some embodiments, the IR camera 202 may be located in line with and directly next to one of the outer IR lasers 204.

In various embodiments, the imaging device 200 may be used to capture images of a scene 208. In addition, the imaging device 200 may be used to determine depth data for one or more objects 210 within the scene 208, thus providing for the construction of a 3D image of the scene 208. Specifically, the IR lasers 204 may be used to recursively emit three unique density modulated binary patterns onto the scene 208, and the IR camera 202 may capture one image corresponding to each density modulated binary pattern. In other words, the first IR laser 204 may be activated, and the IR camera 202 may capture an image of the scene 208 as the first IR camera 202 emits its unique density modulated binary pattern onto the scene 208. The first IR laser 204 may then be deactivated, and this process may be repeated for the second and third IR lasers 204. The captured images may then be analyzed to determine depth data for the one or more objects 201 in the scene 208, as discussed further below.

The schematic of FIG. 2 is not intended to indicate that the imaging device 200 is to include all the components shown in FIG. 2. Further, the imaging device 200 may include any number of additional components not shown in FIG. 2, depending on the details of the specific implementation.

Figure 3:
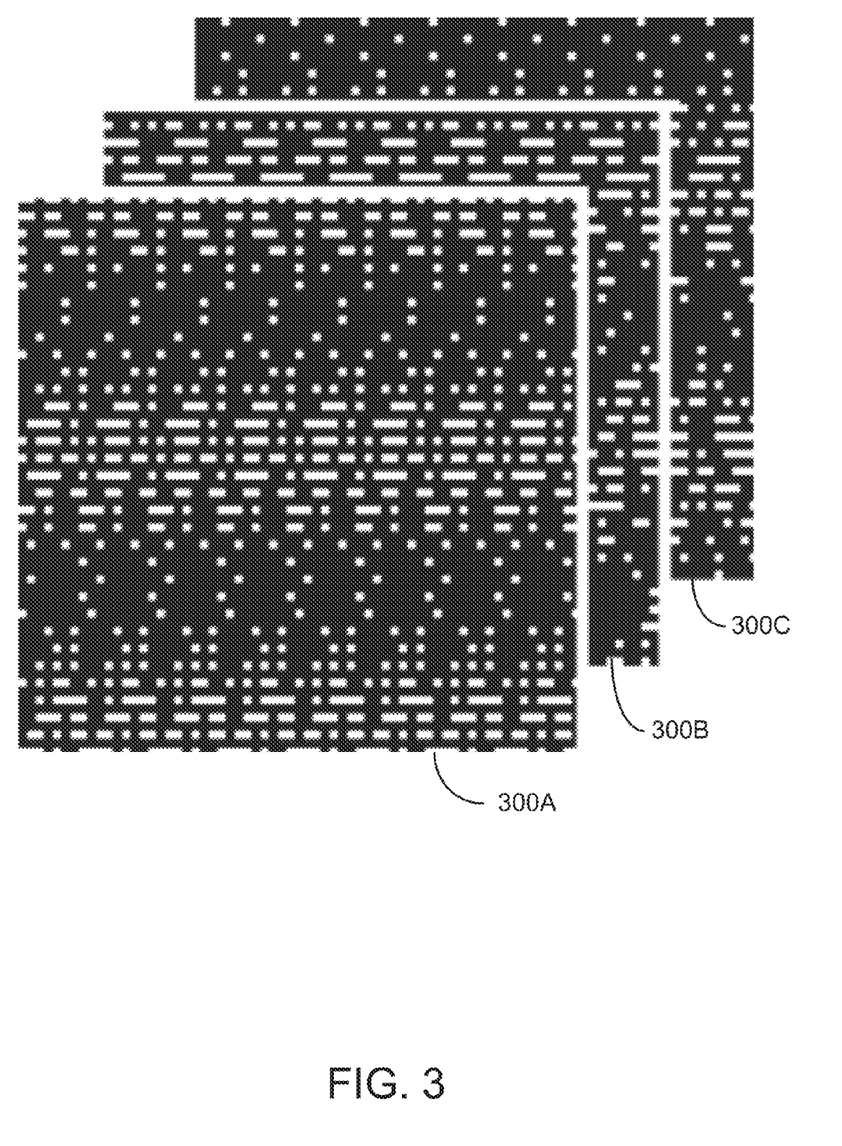
FIG. 3 is a schematic showing density modulated binary patterns that may be used according to embodiments described herein.

FIG. 3 is a schematic showing density modulated binary patterns 300A-C that may be used according to embodiments described herein. In various embodiments, the density of the light spots for each density modulated binary pattern 300A-C may be modulated such that each density modulated binary pattern 300A-C carries phase information. A pattern may be defined as P(r,c), where row r=0, . . . , R−1 and column c=0, . . . , C−1. With some existing systems, such as the Kinect™ system by Microsoft Corporation, the light spots are randomly and uniformly distributed in P(r,c). However, according to embodiments described herein, the numbers of light spots in different rows of the density modulated binary patterns 300A-C are determined according to a sinusoidal function, as shown below in Eq. (1).

$$k(r) = \text{Round}\left\{\left[\sin\left(2\pi \frac{r}{T} + \theta\right) + 1\right] \times \alpha + 1\right\} \quad (1)$$

In Eq. (1), Round( ) is a function for rounding a floating number to an integer. The term r is the row index. The term T is the number of rows in a sinusoidal period. The term α is a scaling factor to control k(r) as an integer from 1 to K. The three density modulated patterns 300A-C may be generated by setting θ to −2π/3, 0, or +2π/3, respectively.

In various embodiments, the pixels may be determined such that all the pixels in the same row have the same intensity. This may be accomplished using a pattern generation technique for which 1×N pixels is defined as the basic unit for pattern generation. The term N is larger than the maximum k(r). The positions of the light spots are random in a basic unit, but are the same for all basic units in the same row. This ensures that every slide window located in the same row has the same average intensity. In addition, since the number of light spots and their positions are different in different rows, the positions of light spots in every block are still unique. The pattern generation technique may then be defined according to the following pseudocode.

```
Require: The number of rows in one period is T, the scaling
    factor is α, and the initial phase is θ.
    for r = 1,...,R do
        Calculate k(r) according to the Eq. (1).
        Separate the row into M non-overlapping basic units.
        for m = 1,..., M do
            Randomly select k(r) positions from 1 to N. The
            pixels at the selected positions are light spots.
        end for
    end for
```

In various embodiments, the scaling factor α may be determined based on the term N and the range of k(r), where N is an empirical parameter. The larger the value of N is, the greater number of different values k(r) can have. If the value of N is too large, e.g., when k(r) is a small integer, the density k(r)/N will be too small to establish the correspondences. Thus, in some embodiments, N may be set to a value of 8. When the value of N is decided, the maximum value of k(r) can be selected as large as 5 in order to have more densities in a period. Several different approaches may be used to generate patterns with N=8 and k(r)∈{1, . . . , 5}. For example, a pattern in which every other row contains the number of light spots calculated by Eq. (1) and the other rows are black may be used.

The smaller the value of the period T is, the more accurate the depth measurement will be. However, according to embodiments described herein, T may also have a minimum acceptable value. For N=8 and k(r)∈{1, . . . , 5}, if T is smaller than 32, not every density k(r) appears due to a rounding error. In other words, the range of k(r) is not fully used. Therefore, in some embodiments, the period T may be set to 32.

In some cases, it may be desirable to evaluate whether the densities of the generated density modulated binary patterns 300A-C can approximate the sinusoidal fringe well. The approximation is completed by the average energy in a N×N slide window. For simplicity, the case for which the signal k(r) is continuous may be considered, as shown below in Eq. (2).

$$E = \frac{1}{N^2} \int_{r-N/2}^{r+N/2} k(r) dr \qquad (2)$$

If Eq. (1) is substituted into Eq. (2), and the rounding and the constant term are ignored, Eq. (2) may be rewritten as shown below in Eq. (3).

$$E = \frac{1}{N^2} \int_{r-N/2}^{r+N/2} \alpha \sin\left(2\pi \frac{r}{T} + \theta\right) = \beta \sin\left(\pi \frac{N}{T}\right) \sin\left(2\pi \frac{r}{T} + \theta\right) \qquad (3)$$

In Eq. (3), the terms β and $$\sin\left(\pi \frac{N}{T}\right)$$

are constant.

Therefore, the energy E in the proposed density modulated binary patterns 300A-C is a sinusoidal function mathematically. However, since the proposed density modulated binary patterns 300A-C are binary, k(r) in Eq. (1) has to be rounded to an integer. When approximating sinusoidal fringe, such rounding may result in obvious stair-wise errors in the approximation. If the errors are not handled carefully during reconstruction of the depth data, a systematic error will be introduced to the reconstructed depth data.

Figure 4:
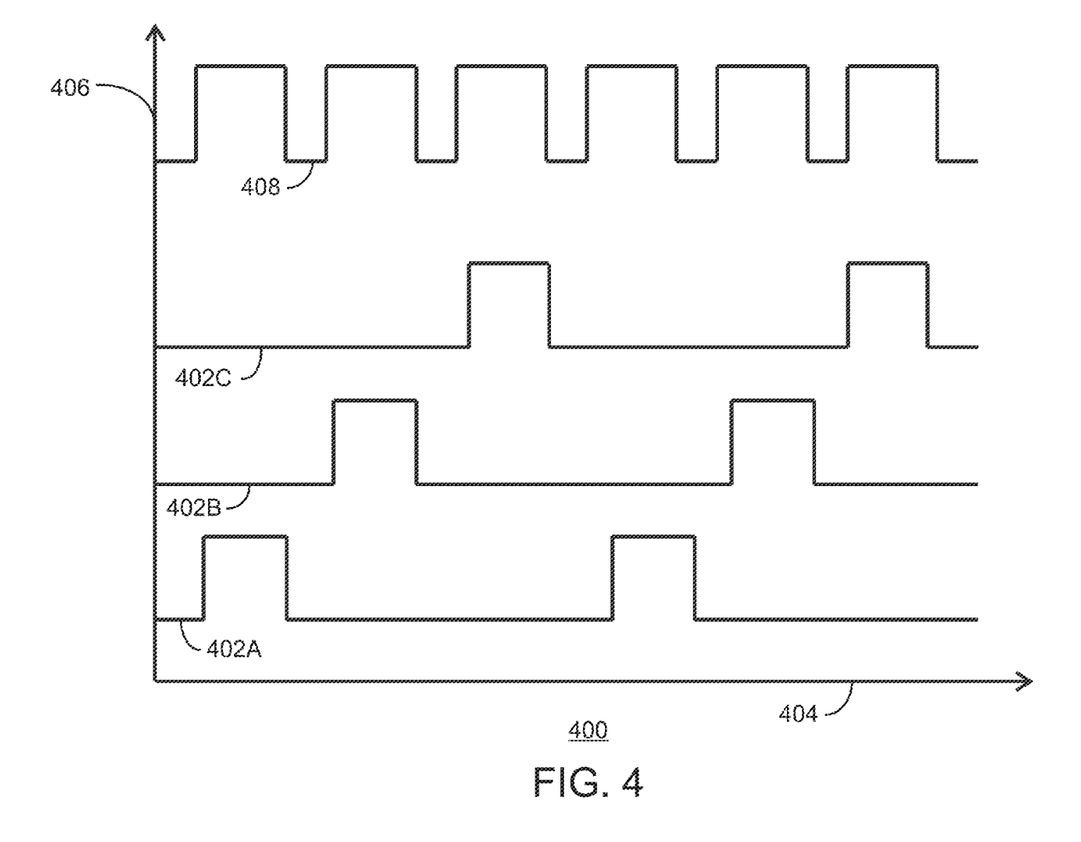
FIG. 4 is a graph showing timing circuits for controlling the emission of the density modulated binary patterns by the three IR lasers according to embodiments described herein.

FIG. 4 is a graph 400 showing timing circuit 402A-C for controlling the emission of the density modulated binary patterns by the three IR lasers according to embodiments described herein. An x-axis 404 of the graph 400 may represent time. A y-axis 406 of the graph may represent the timing circuits 402A-C for controlling the emission of the density modulated binary patterns by the three IR lasers, as well as an image capture timing circuit 408 for the IR camera.

As shown in FIG. 4, each IR laser includes a different timing circuit 402A-C for emitting its respective density modulated binary pattern. Therefore, the density modulated binary patterns may be recursively emitted by the three infrared lasers. An IR camera may be used to capture each density modulated binary pattern as it is emitted by one of the IR lasers, as shown by the image capture timing circuit 408 for the IR camera.

Figure 5A:
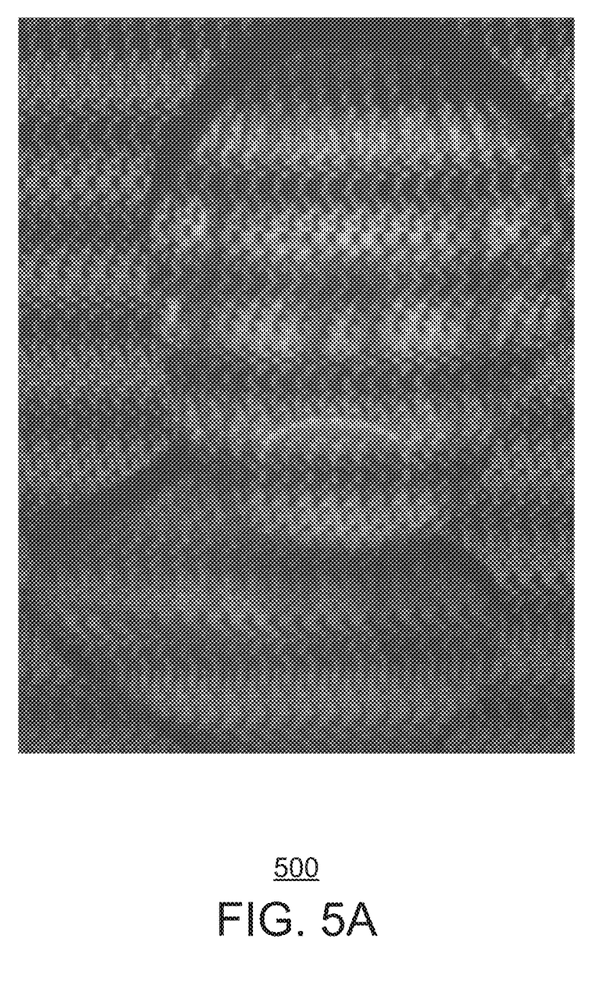
FIG. 5A is a schematic showing a captured image with an emitted pattern.

FIG. 5A is a schematic showing a captured image 500 with an emitted pattern. Since the positions of the light spots in every small block is still unique, a block matching technique may be used to determine the disparity of every pixel between the reference image Ī(r,c) and the captured image I(r,c). The reference image Ī(r,c) is the captured image in a vertical plane with the known distance. Zero-normalized cross-correlation (ZNCC) over a block may be used as the measurement. The disparity at (r,c) may be calculated as shown below in Eq. (4).

$$D_1(r, c) = \max_{r',c'} \frac{\sum_i \sum_j A(r, c, i, j) B(r', c', i, j)}{\sqrt{\sum_i \sum_j A^2(r, c, i, j) \Sigma_i \Sigma_j B^2(r', c', i, j)}} \qquad (4)$$

In Eq. (4), A(r,c,i,j)=I(r+i,c+j)−I$_0$ and B(r',c',i,j)=Ī(r'+i,c'+j)−Ī$_0$. The terms I$_0$ and Ī$_0$ are the average intensities of I and Ī, respectively. The term D$_1$(r,c) is the row and column disparity with the maximum ZNCC. Every pixel belongs to multiple overlapping blocks for calculating ZNCC and, thus, has multiple disparities calculated by Eq. (4). The disparity of the pixel may be decided by the block with the largest ZNCC.

Figure 5B:
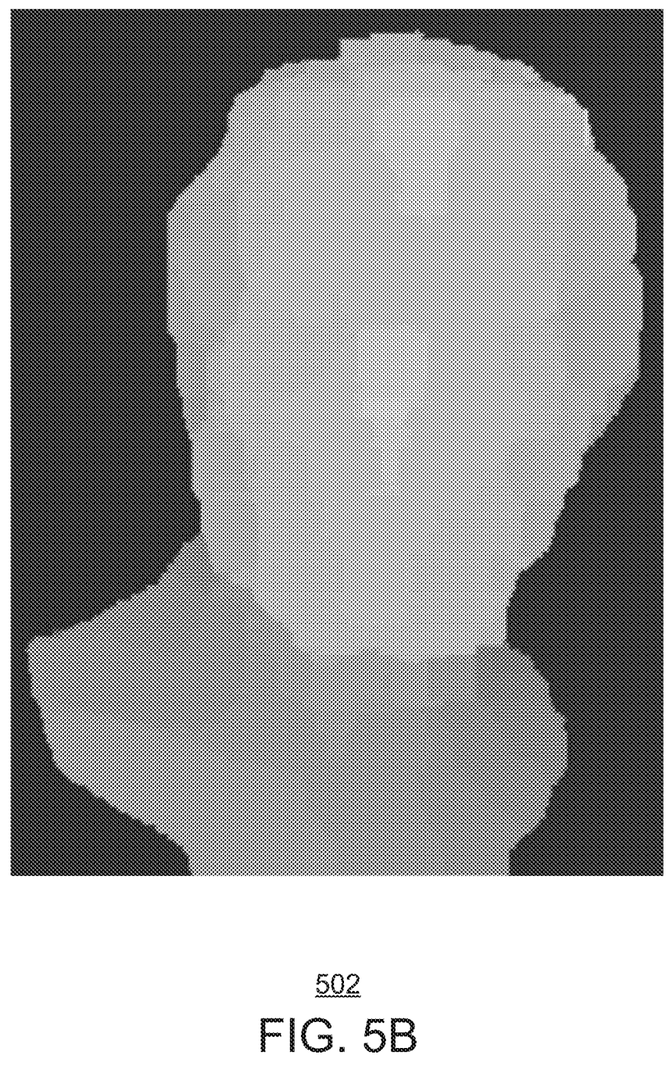
FIG. 5B is a schematic showing an image including the reconstructed depth data for the captured image of FIG. 5A through the block matching technique.

FIG. 5B is a schematic showing an image 502 including the reconstructed depth data for the captured image 500 of FIG. 5A through the block matching technique. According to the image 502 of FIG. 5B, the depth data is reconstructed using the block matching technique described above. The discontinuity in the smooth surface of the image 502 can be clearly observed from FIG. 5B. For every captured image, an energy image may be calculated using the discrete version of Eq. (2).

Figure 5C:
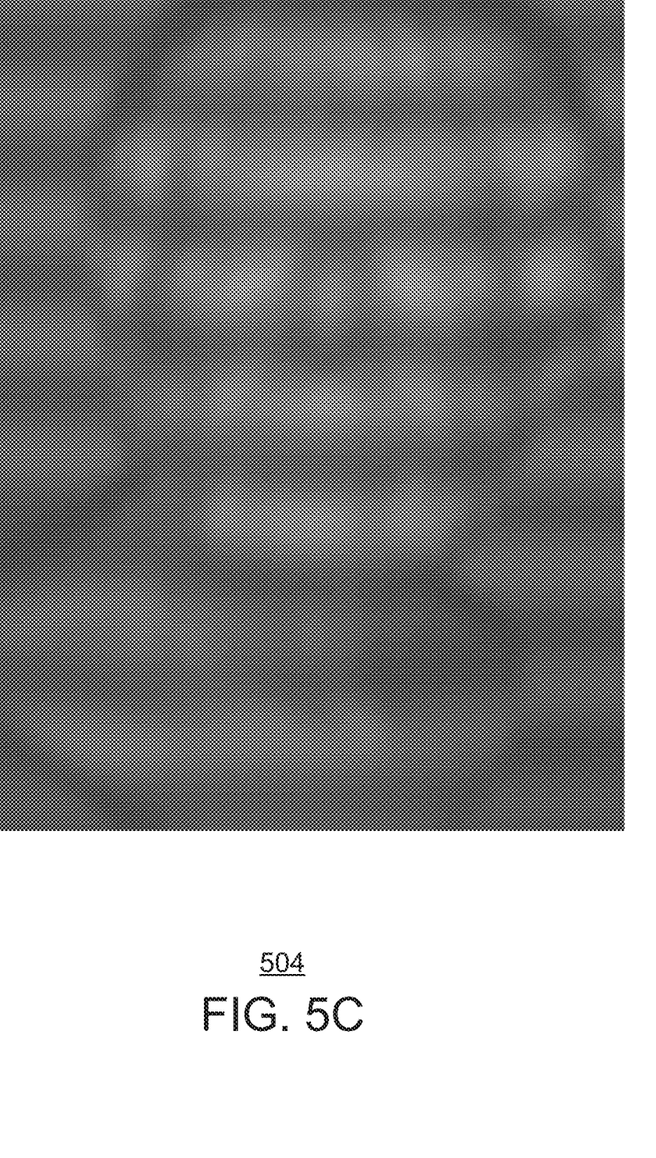
FIG. 5C is a schematic showing an energy image generated from the captured image of FIG. 5A.

FIG. 5C is a schematic showing an energy image 504 generated from the captured image 500 of FIG. 5A. The energy images of the reference image and the captured images may be defined as Ē$_i$(r,c) and E(r,c), respectively, wherein the term i indicates different θ. The three energy images may have the relationship shown below in Eq. (5).

$E_{i-1}(r,c)=E'(r,c)+E''(r,c)\sin[\phi(r,c)-2\pi/3]$, $E_i(r,c)=E'(r,c)+E''(r,c)\sin[\phi(r,c)]$, $E_{i+1}(r,c)=E'(r,c)+E''(r,c)\sin[\phi(r,c)+2\pi/3]$ \qquad (5)

In Eq. (5), the term E'(r,c) is the background intensity; the term E''(r,c) is the sinusoidal amplitude; and the term φ(r,c) is the phase image to be solved. In addition, the term E$_{i-1}$(r,c)−

$E_{i+1}(r,c)$ is the average intensity in a small area. The phase $\phi(r,c)$ can be obtained by solving Eq. (6).

$$\phi(r, c) = \arctan\left\{\frac{\sqrt{3}\,[E_{i-1}(r, c) - E_{i+1}(r, c)]}{2E_i(r, c) - E_{i-1}(r, c) - E_{i+1}(r, c)}\right\} \quad (6)$$

For typical phase shifting systems, the depth data can be directly calculated from $\phi(r,c)$. However, since the pattern used according to embodiments described herein includes a stair-wise error for approximating the sinusoidal phase, the depth data may not be calculated directly from $\phi(r,c)$. Instead, a pixel based phase matching technique may be used to calculate the depth data. First, $\bar\phi(r,c)$ may be calculated from the reference energy images $\overline{E}_i(r,c)$. For every phase $\phi(r,c)$, the most matched $\bar\phi(r-\Delta r,c)$ within one period may be determined. The disparity $d_2(r,c)$ in one period may then be calculated according to Eq. (7).

$$d_2(r, c) = \begin{cases} \Delta r + \dfrac{\bar\phi(r - \Delta r, c) - \phi(r, c)}{\bar\phi(r - \Delta r, c) - \bar\phi(r - \Delta r - 1, c)}, & \phi(r, c) \le \bar\phi(r - \Delta r, c) \\ \Delta r - \dfrac{\phi(r, c) - \bar\phi(r - \Delta r, c)}{\bar\phi(r - \Delta r + 1, c) - \bar\phi(r - \Delta r, c)}, & \phi(r, c) > \bar\phi(r - \Delta r, c) \end{cases} \quad (7)$$

In Eq. (7), $\Delta r$ is the integer row disparity. The other term in Eq. (7) is the fractional row disparity by the linear interpolation.

The ambiguity problem may also be solved. If there are M periods in the captured images, the period with the disparity $d_2(r,c)$ may be identified. Identifying the period with the disparity $d_2(r,c)$ may be relatively easy since the positions of the light spots are different for every period. The ZNCC values for m=1, . . . , M can be determined, and the period m with the largest ZNCC may be selected. Finally, the disparity can be reconstructed according to Eq. (8).

$$D_2(r,c) = d_2(r,c) + m \times L \quad (8)$$

In Eq. (8), the term L is the number of rows in one period in the captured images.

Figure 5D:
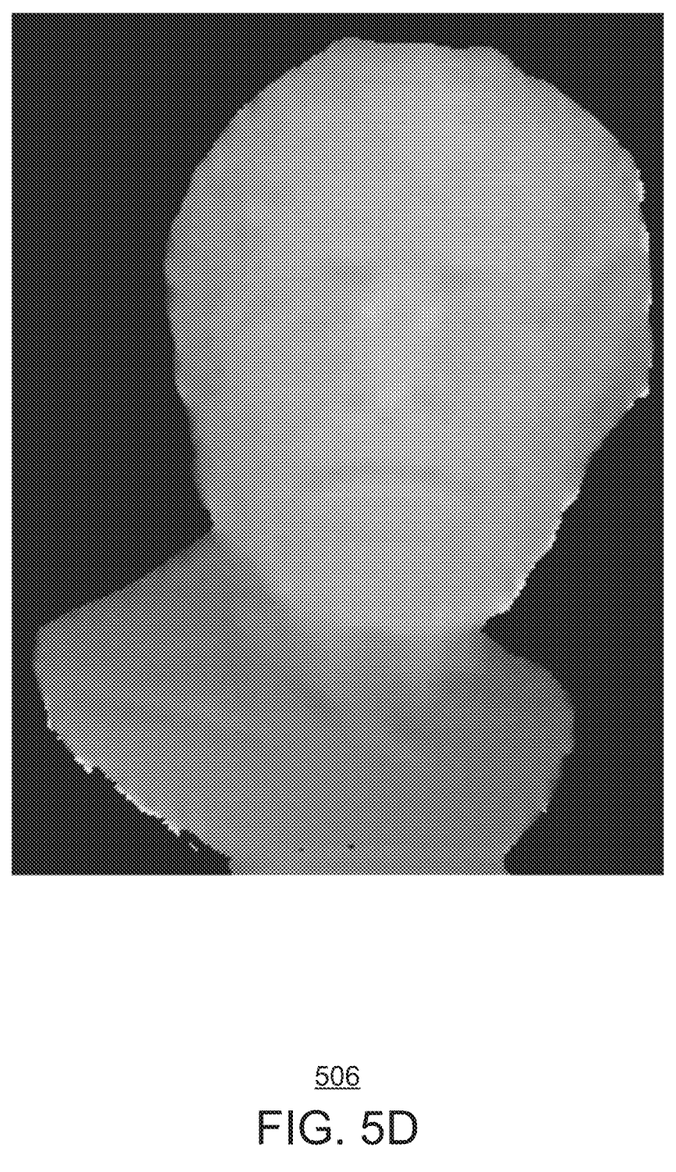
FIG. 5D is a schematic showing an image including depth data for the image of FIG. 5A that may be reconstructed from three energy images according to embodiments described herein.

FIG. 5D is a schematic showing an image 506 including depth data for the image 500 of FIG. 5A that may be reconstructed from three energy images according to embodiments described herein. Specifically, the depth data may be reconstructed using the pixel based phase matching technique described above.

Although using the embedded phase to reconstruct the depth data for objects in a scene may produce high quality results, the technique utilizes at least three captured images and cannot handle moving objects in the scene. By contrast, the block matching technique for reconstructing depth data only utilizes one captured image and is able to handle moving objects in the scene. Therefore, according to embodiments described herein, the block matching technique may be used to determine depth data for a scene with moving objects.

According to the block matching technique, the depth data $D_1(r,c)$ and $D_2(r,c)$ may be integrated according to the motion detected in the scene. Changes in intensity may be used to detect if there is any motion in the scene. The current captured image may be compared with the previous third image because their patterns are the same. If the average intensity change in a region is larger than a threshold, the region may be marked as moving. Depth data $D_1(r,c)$ may then be adopted in the moving regions, while depth data $D_2(r,c)$ may be adopted in the stationary regions.

Figure 6:
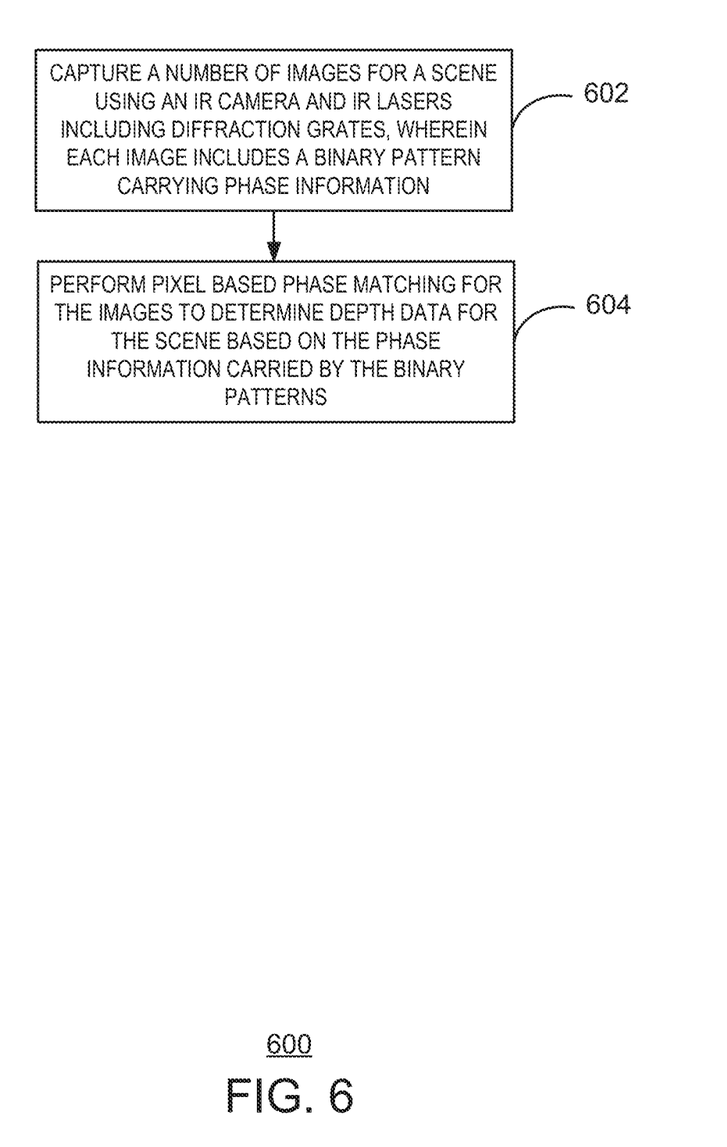
FIG. 6 is a process flow diagram of a method for depth acquisition from density modulated binary patterns.

FIG. 6 is a process flow diagram of a method 600 for depth acquisition from density modulated binary patterns. The method 600 may be implemented by the computing system 100 and/or the imaging device 200 discussed with respect to FIGS. 1 and 2, respectively. The method 600 begins at block 602, at which a number of images for a scene are captured using an IR camera and a number of IR lasers including diffraction grates. Each image includes a density modulated binary pattern carrying phase information.

In various embodiments, three images are captured using the IR camera and three IR lasers including diffraction grates. However, it is to be understood that any suitable number of images may be captured using any suitable number of IR lasers according to embodiments described herein.

At block 604, pixel based phase matching is performed for the images to determine depth data for the scene based on the phase information carried by the binary patterns. This may be accomplished by extracting the phase information from the binary patterns and reconstructing the depth data for the scene based on a combination of the phase information for the binary patterns. In addition, in various embodiments, phase ambiguity within the images is corrected prior to performing pixel based phase matching for the images. The phase ambiguity may be corrected based on a local uniqueness of each binary pattern.

In some embodiments, the scene includes one or more moving objects. In such embodiments, block matching is performed to determine depth data for the portion(s) of the scene including the one or more moving objects.

In various embodiments, the depth data is used to determine the absolute depth for the scene. In addition, the depth data may be used to generate a three-dimensional image (or video) of the scene.

The process flow diagram of FIG. 6 is not intended to indicate that the blocks of the method 600 are to be executed in any particular order, or that all of the blocks are to be included in every case. Further, any number of additional blocks not shown in FIG. 6 may be included within the method 600, depending on the details of the specific implementation.

The method 600 may be used for a variety of applications. In some embodiments, the method 600 may be used to provide 3D images (or videos) for gaming applications. For example, the method 600 may be implemented within the Kinect™ system by Microsoft Corporation. In addition, in some embodiments, the method 600 may be used to provide 3D images (or videos) for telepresence applications or other virtual reality applications.

Figure 7:
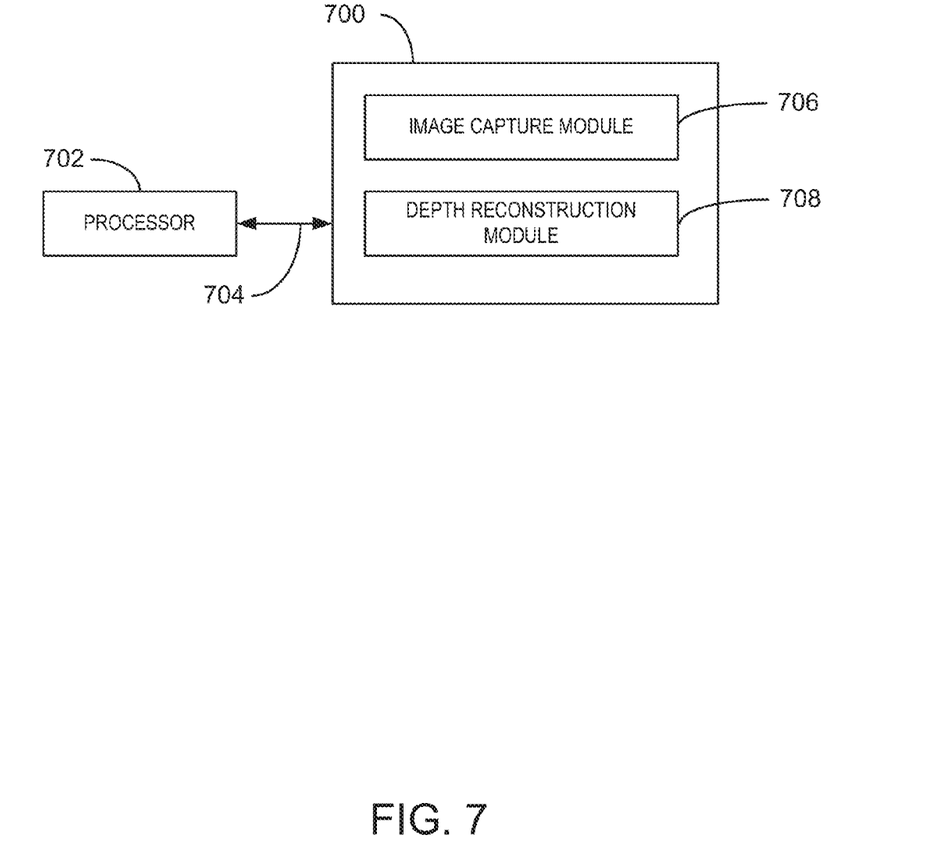
FIG. 7 is a block diagram of a computer-readable storage medium that stores code adapted to determine depth data for captured images using density modulated binary patterns.

FIG. 7 is a block diagram of a computer-readable storage medium 700 that stores code adapted to determine depth data for captured images using density modulated binary patterns. The computer-readable storage medium 700 may be accessed by a processor 702 over a computer bus 704. Furthermore, the computer-readable storage medium 700 may include code configured to direct the processor 702 to perform the steps of the current method.

The various software components discussed herein may be stored on the computer-readable storage medium 700 as indicated in FIG. 7. For example, an image capture module 706 may be adapted to capture images of a scene using an IR camera and a number of IR lasers including diffraction grates. In addition, a depth reconstruction module 708 may be adapted to reconstruct depth data for the captured images based on binary patterns within the images.

The block diagram of FIG. 7 is not intended to indicate that the computer-readable storage medium 700 is to include all the components shown in FIG. 7. Further, the computer-readable storage medium 700 may include any number of additional components not shown in FIG. 7, depending on the details of the specific implementation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for depth acquisition from density modulated binary patterns, comprising:
    capturing a plurality of images for a scene using an IR camera and a plurality of IR lasers comprising diffraction grates, wherein each of the plurality of images comprises a density modulated binary pattern carrying phase information; and
    performing pixel based phase matching for the plurality of images to determine depth data for the scene based on the phase information carried by the density modulated binary patterns, the density modulated binary patterns comprising a number of light spots based on a sinusoidal function.

2. The method of claim 1, wherein performing pixel based phase matching for the plurality of images comprises:
    extracting the phase information from the density modulated binary pattern for each of the plurality of images; and
    reconstructing the depth data for the scene based on a combination of the phase information for the density modulated binary patterns for all of the plurality of images.

3. The method of claim 1, comprising determining an absolute depth for the scene based on the depth data.

4. The method of claim 1, comprising generating a three-dimensional image of the scene based on the depth data.

5. The method of claim 1, wherein capturing the plurality of images comprises capturing three images using an IR camera and three IR lasers comprising diffraction grates.

6. The method of claim 1, comprising using a local uniqueness of each density modulated binary pattern to correct phase ambiguity within each of the plurality of images.

7. The method of claim 1, comprising determining depth data for a portion of the scene comprising a moving object.

8. The method of claim 1, comprising determining the phase information for the density modulated binary patterns based on a density of light spots in each of the plurality of images.

9. The method of claim 1, comprising using the depth data for a gaming application or a virtual reality application.

10. A system for depth acquisition from density modulated binary patterns, comprising:
    a plurality of IR lasers, wherein each of the plurality of IR lasers is configured to emit a density modulate binary pattern carrying phase information onto a scene via a diffraction grate;
    an IR camera configured to capture an image corresponding to the density modulated binary pattern emitted by each of the plurality of IR lasers;
    a processor; and
    a system memory comprising code that, when executed by the processor, is configured to analyze the images to determine depth data for the scene based on the phase information carried by the density modulated binary patterns, the density modulated binary patterns comprising a number of light spots based on a sinusoidal function.

11. The system of claim 10, comprising a synchronized circuit for controlling the plurality of IR lasers and the IR camera.

12. The system of claim 10, wherein the processor comprises a central processing unit (CPU) or a graphics processing unit (GPU), or both.

13. The system of claim 10, wherein the code is configured to analyze the images by performing pixel based phase matching to determine the depth data for the scene.

14. The system of claim 10, wherein the code is configured to analyze the images by extracting the phase information from the density modulated binary pattern for each image and reconstructing the depth data for the scene based on a combination of the phase information for the density modulated binary patterns for all of the images.

15. The system of claim 10, wherein the code is configured to determine depth data for a portion of the scene comprising a moving object.

16. The system of claim 10, wherein the code is configured to correct phase ambiguity within the images based on a local uniqueness of each density modulated binary pattern.

17. The system of claim 10, wherein the code is configured to generate a three-dimensional image of the scene based on the depth data.

18. The system of claim 17, comprising a display device configured to display the three-dimensional image of the scene.

* * * * *